United States Patent [19]

Tahara

[11] Patent Number: 5,866,009
[45] Date of Patent: Feb. 2, 1999

[54] APPARATUS FOR PURIFYING WATER FROM ORGANIC HALIDES CONTAINED THEREIN

[76] Inventor: Yoshimasa Tahara, Toyama, Japan

[21] Appl. No.: 825,337

[22] Filed: Mar. 28, 1997

[30] Foreign Application Priority Data

Mar. 29, 1996 [JP] Japan ................................. 8-103397

[51] Int. Cl.$^6$ ...................................................... C02F 1/28
[52] U.S. Cl. .......................... 210/691; 210/284; 210/507; 210/508; 210/692; 210/694; 210/908
[58] Field of Search ..................................... 210/263, 284, 210/691, 694, 908, 507, 508, 692

[56] References Cited

U.S. PATENT DOCUMENTS

| | | |
|---|---|---|
| 4,276,179 | 6/1981 | Soehngen . |
| 4,859,559 | 8/1989 | Trout ........................................ 430/115 |
| 5,300,685 | 4/1994 | Scates et al. ............................. 210/690 |
| 5,460,792 | 10/1995 | Rosenbaum ............................. 210/763 |
| 5,645,374 | 7/1997 | Lesage et al. ........................... 210/908 |

FOREIGN PATENT DOCUMENTS

| | | |
|---|---|---|
| 9052578 | 3/1984 | Japan . |
| 3093355 | 4/1988 | Japan . |
| 1046464A | 10/1966 | United Kingdom . |

*Primary Examiner*—Jay H. Woo
*Assistant Examiner*—Betsey J. Morrison
*Attorney, Agent, or Firm*—Birch, Stewart, Kolasch & Birch, LLP

[57] ABSTRACT

The invention aims to provide an apparatus for purifying water containing organic halides therein improved so as to substantially achieve perfect removal of organic halides from water which has conventionally been considered to be impossible. The object set forth above is achieved, according to the invention, by an apparatus for purifying water containing organic halides therein characterized in that particles, fibers, nonwoven fabric, porous body or sintered body containing hydroxycarboxylic acid or polymer thereof having a chemical structure expressed by general formula:

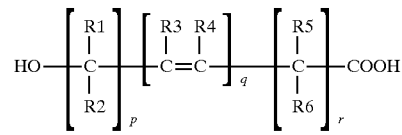

where R1–R6 are identical or different and represent hydrogen atom, hydroxyl-, carboxyl-, amino-, cyano- or alkyl-group having 1–5 carbons, p represents a natural number 1–10, and q and r represent an integer 0–10) as a main ingredient is used as organic halide adsorbent; and a residual concentration of organic halides in water can be decreased to the order of ppb.

12 Claims, 3 Drawing Sheets chloroform concentration changing as the time elapses ( initial concentration 1000 ppb )

APPARATUS FOR PURIFYING WATER FROM ORGANIC HALIDES CONTAINED THEREIN

BACKGROUND OF THE INVENTION

1. Field of the Invention

The present invention relates to an apparatus for purification of water from organic halides contained therein improved so as to achieve an efficiency as close as to the ideal level of perfect purification which has conventionally never been attained.

Indeed, the invention allows a concentration of residual organic halides contained in water to be decreased to the order of p p b.

2. Prior Art

Conventionally, the active carbon adsorption process and the porous particle adsorption process have been utilized for purification of water from organic halides contained therein. While these processes have been effective to decrease a concentration of the residual organic halides to the order of p p m, it has been difficult for these processes to decrease the residual concentration to the order lower than said p p m. In addition, organic halides generally present a chemical stability which is too high to be easily decomposed by microorganisms.

It is also known to utilize volatility of organic halides for purification of water and, according to this process, organic halides are forcibly evaporated by dispersing air bubbles into water.

While organic halides are very useful substances for various industries, they may always adversely affect our environment and therefore strict standards have been prescribed with respect to handling of these substances. Specifically, the presence of these substances in water even at a concentration as low as in the order of p p b is considered to affect the ecosystem. Consequently, the foul water quality standard reading "should not be detected" has been prescribed. Expression "should not be detected" can be construed, in view of the detection limit of the presently available analyzers, as 10 p p b. This value is extremely small and even a slight quantity of organic halides contained in foul water may exceed the standardized limit value. Accordingly, these standard really aim to prohibit any use of organic halides.

To decompose organic halides resistant to decomposition by microorganism, active carbon and porous particles have conventionally been utilized to adsorb these organic halides thereon. However, an adsorption efficiency achieved by the process utilizing porous particles is limited by the phenomenon of adsorption equilibrium, i.e., a rate of adsorption for organic halides remains in equilibrium with a rate of desorption for organic halides so long as their concentrations are less than a predetermined level. With a consequence, this porous particle adsorption process is limited in its effect of decreasing the organic halide concentration. While the other impurities contained in water can be disposed without any problem because the standard concentrations prescribed for most of them are substantially higher than said equilibrium concentration, it is practically difficult for organic halides to be completely disposed because the equilibrium concentration is higher than the standard concentration prescribed for organic halides.

Dispersion air bubble into water containing these organic halides causes the organic halides to be evaporated into said air bubbles and then to be diffused into the outer air. As a result, the concentration of the organic halides in water can be thereby decreased. Certainly, this process can decrease the concentration to a level lower than the level achieved by the conventional active carbon adsorption process. However, this is a less recommendable process, because the organic halides thus diffused into the outer air may often cause another environmental pollution.

In spite of the strict regulation standards for organic halides, pollution of respective hydrospheres has steadily become serious and widespread even to sources of respective waterworks. Presently, the waterworks law includes no distinct regulation concerning the organic halides. Should the source of water supply be polluted by organic halides, polluted water would be supplied to general households because perfect removal of the organic halides is difficult. Eventually, foul water from the household would exceed the standardized concentration value. Presently, the only measure possibly taken to avoid such environmental pollution due to organic halides is "to avoid the use of organic halides". However, it is practically impossible to fully prohibit use of organic halides, since these organic halides are industrially important substances. Accordingly, there is always a serious demand for satisfactory purification of water already polluted by organic halides.

SUMMARY OF THE INVENTION

The entire disclosure of Japanese Patent Application No. 8-103397 filed on Mar. 29, 1996 including the specification, claims, drawings and summary are incorporated herein by reference in its entirety.

In view of the problem as has been described above, it is a principal object of the invention to decrease organic halides contained in water to an unanalyzable concentration.

The object set forth above is achieved, according to the invention, by an apparatus developed by the inventors on the basis of findings as will be described below:

Hydroxycarboxylic acid or polymer thereof (referred to hereinafter as the inventive material) having a chemical structure given by general formula:

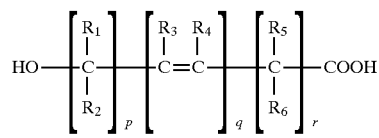

However, even when such organic halides are dissolved in water, a concentration thereof is limited to the order of p p m by their solubility. Accordingly, when the hydroxycarboxylic acid or polymer thereof (i.e., the inventive material) is immersed in water containing such organic halides, the inventive material is hardly attached and neither deformed nor degenerated. The inventors obtained still another unexpected finding that the inventive material functions as a decontaminating agent for organic halides when it is added into water containing the organic halides dissolved therein.

A rule concerning the solute concentration ratio is well known, according to which, when a pair of non-intermixable solvents A, B are placed in contact with each other and a solute soluble in both solvents is dissolved in these two solvents, a ratio of solute concentrations CA, CB in these two solvents A, B is constant:

$$CA/CB = D \text{ (constant)}$$

where D represents a distribution ratio which is constant independently of a quantity of solvents so long as a temperature is constant.

It was found by the inventors that this rule is applicable to a system comprising the inventive material and water.

In contradiction to the popular view, the inventive material can be considered as a liquid of a high viscosity, for example, in view of fact that it comprises crystallized and uncrystallized portions coexisting with each other, it has no distinct melting point and it is permeable for various gases. The most important aspect of the invention lies in that the desired purification of water from organic halides is achieved by dissolving the organic halides in the inventive material rather than by mechanical adsorption of the organic halides on the inventive material.

In other words, a ratio of the organic halide concentration CP dissolved in the inventive material to the organic halide concentration CW in water may be increased to decrease the residual organic halides in water to the correspondingly low concentration. Certainly, such relationship of concentrations is also one of the typical equilibrium relationship just as observed in the case of the active carbon adsorption process.

$$\frac{Cp}{Cw} = \frac{\text{equilibrium concentration of organic halides in the inventive material}}{\text{equilibrium concentration of organic halides in water}}$$

However, according to the dissolving process adopted here by the invention, the equilibrium is established with most of organic halides dissolved in the inventive material and consequently the value of said numerical formula (value of distribution ratio) exceeds 10,000.

While the other compounds such as polybutadiene, polystyrene, styrene-acrylonitrile copolymer, polycarbonate and polymethyl methacrylate are soluble in organic halides, the values of distribution ratios achieved by these compounds are substantially smaller than in the case of the inventive material and therefore it is impossible for these other compounds to decrease the organic halide concentration in water to the order of p p b.

The inventive material is hydroxycarboxylic acid or polymer thereof having the chemical structure expressed by said general formula, but it is not required to use a single type of the inventive material independently and a mixture of various types thereof may be also effectively used. Concerning the polymerization, not only homopolymer but also copolymer of several different hydroxycarboxylic acids may be used depending on particular purposes. Examples of the inventive material which can be independently used include hydroxystearic acid, hydroxyoleic acid-hydroxyvalerianic acid copolymer, polylacetic acid, polyglyceric acid and polyglycolic acid. Depending on purposes as well as conveniences for process, a mixture of these compounds may be also effectively used.

DESCRIPTION OF THE PREFERRED EMBODIMENT

Figure 1:
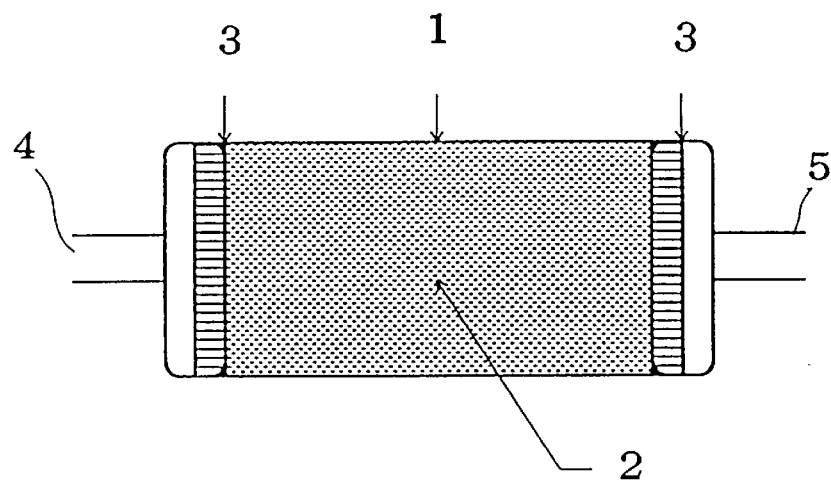
FIG. 1 is a schematic diagram illustrating a theoretical embodiment of the inventive apparatus.

Referring to FIG. 1, in practical water purification, an organic halide adsorption cylinder 1 is filled with the inventive material 2 and water to be purified may be guided so as to enter at its inlet 4 and then to exit from its outlet 5. Reference numeral 3 designates a filter used to prevent fine particles from flowing out. The inventive material 2 filled into the organic halide adsorption cylinder 1 should be preferably in the form of fine particles in view of a fact that the specific surface area of the inventive material may be reduced in order to dissolve the organic halides therein at the correspondingly higher rate. The particle diameter may be in a range of $0.01-1000\mu$, preferably in a range of $0.1-10\ \mu$. The particle diameter exceeding 1000 $\mu$ may unacceptably decrease a dissolving rate of the organic halides and make desired water purification impossible. On the other hand, the particle diameter less than $0.01\ \mu$ will accelerate dissolution of the organic halides but increase a resistance and consequently decrease a water purification rate. In any case, the interdependency of the water purification rate and the organic halide concentration must be exactly determined before the particle diameter is selected.

For granulation of the inventive material, the grinding process and the reprecipitation process using poor solvent are available. It is difficult for the former to obtain particles of uniform diameter, usually with a particle size distribution. In this case, the particle diameters may be made uniform by sieving. When the latter is employed, the inventive material may be dissolved, for example, in ethyl acetate followed by addition of poor solvent such as methanol to form reprecipitation which may be filtered/dried to obtain the particles of an expected uniform diameter. This process of reprecipitation produces relatively uniformly sized particles with a limited particle-sized distribution. However, even after the effort of making the particle diameter, there may be much or less admixture of particles with their diameters substantially smaller than the desired particle diameter and these smaller particles may flow out together with water. To avoid this, it is also possible to use the inventive material in the form of a porous plate or sintered plate.

The inventive material, particularly when it is used in the form of a polymer, may sometimes have a portion remaining in the form of a monomer. To avoid undesirable flowing out of a such monomer, the inventive material may be used together with a suitable ion exchange resin. Hydroxycarboxylic acid in the form of a monomer is water-soluble and exhibits a positive action as acid. However, it is possible to remove such monomer by using said ion exchange resin even if said monomer flows out. The quantity of said monomer possibly flowing out is as small as several p p m and therefore the quantity of said ion exchange resin to be used with the inventive material may be 1–5% by weight of the inventive material.

Flowing out of dimer or trimer sometimes can not be reliably overcome by using the ion exchange resin. In this case, the inventive material may be used together with hydroxy-fatty acid or polymer or bridge compound thereof to remove said dimer or trimer. Both hydroxy-fatty acid and polymer or bridge compound of hydroxy-fatty acid are preferably used in the form of fine particles just as the inventive material is. Polymer or bridge compound of hydroxy-fatty acid includes dried linoleic acid and dried linolenic acid. Generally, water-soluble dimer or trimer may flow out by a quantity smaller than in the case of monomer and accordingly the quantity of said hydroxy-fatty acid or polymer or bridge compound thereof to be used with the inventive material may be approximately 1% by weight of the inventive material.

The invention has been developed for purification of water from organic halides contained therein and its decontaminating ability can be expected to attain various impurities other than the organic halides with a few exceptions. Both foul water and water supplied to the waterworks often contain, in addition to the organic halides, various organic matters (e.g., COD), various heavy metal ions, various anions and insoluble fine particles coexisting together. The term "water purification" is usually understood to purify water not only from the organic halides but also from said various impurities other than the organic halides simultaneously. Accordingly, it is desired to provide apparatuses for purifying water from the impurities other than the organic halides in juxtaposition with the inventive apparatus. The impurities other than the organic halides can be satisfactorily removed by the active carbon adsorption process of well known art.

Figure 2:
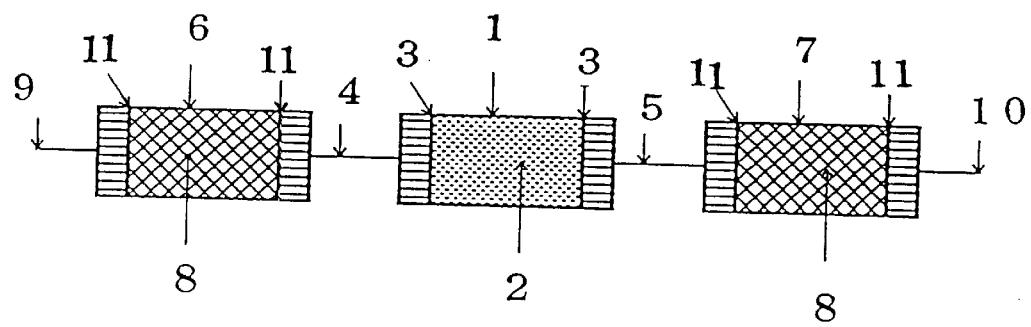
FIG. 2 is a schematic diagram illustrating a specific embodiment using the inventive apparatus.

FIG. 2 schematically illustrates a water purifying equipment using the inventive apparatus. Water supplied to a cylinder 6 filled with active carbon 8 at an inlet 9 is purified from most of the impurities contained in water until the impurities of respective types are decreased to a concentration less than 1 p p m. The concentration of the organic halides is in the order of several hundred p p b at this time point and should not be directly discharged at such a concentration. Specifically, water still containing the organic halides is now supplied to the organic halide adsorption cylinder 1 of the inventive apparatus at its inlet 4 so as to flow through the inventive material 2 and then discharged from the outlet 5. In this way, water is purified by the organic halide adsorption cylinder 1 from the organic halides until their heretofore concentration of several hundred p p b is decreased to unanalyzable level.

When the inventive apparatus is used to purify boiling water, organic substances such as antioxidant and plasticizer usually added to the inventive material 2 may flow out, so it is preferred to guide boiling water again through an additional active carbon adsorption cylinder 7 in order to remove those organic substances possibly flowing out. Accordingly, a serial arrangement of three components (active carbon adsorption cylinder 6)-(organic halide adsorption cylinder 1)-(active carbon adsorption cylinder 7) allows impurities in water to be efficiently removed no matter whether it is cold water or boiling water to be purified. Referring to FIG. 2, reference numerals 3, 11 designate filters used to prevent fine particles from flowing out, reference numeral 8 designates active carbon, and reference numeral 10 designates an outlet. Materials constituting the inventive apparatus are not specified so far as they are neither attacked by organic halides and the other various impurities nor deformed by a pressure of water passing therethrough.

Just like most of impurity adsorbents, the inventive material also is limitative in its organic halide adsorbing capacity. The inventive material after used to its full capacity contains the organic halides dissolved therein but most of substances dissolved therein are organic compounds each containing oxygen atom in its molecule. The inventive material fully used may be disposed in an incinerator.

EXAMPLE 1

Figure 3:
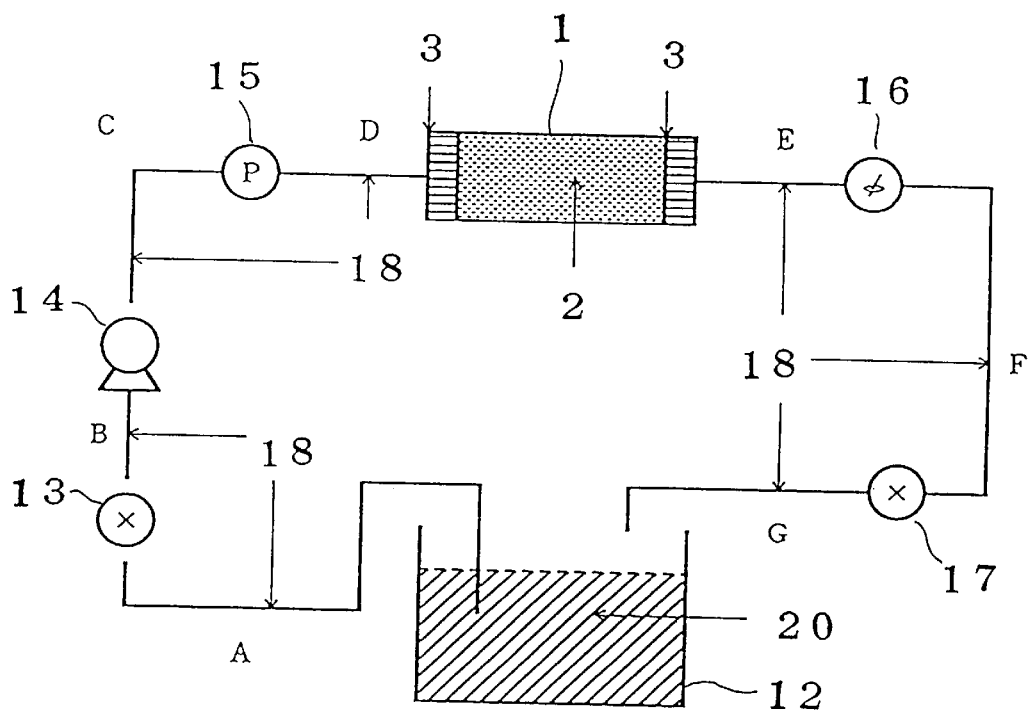
FIG. 3 is a schematic diagram illustrating another specific embodiment using the inventive apparatus.

In the apparatus illustrated in FIG. 3, water 20 containing organic halides and stored in a reservoir 12 is supplied through a conduit 18 along a course A–B–C–D to the organic halide adsorption cylinder 1 of the inventive apparatus under action of a pump 14, then returned through the conduit 18 along a course of E–F–G back to the reservoir 12 and thus subjected to a circulative processing. Reference numeral 13 designates a cock, reference numeral 16 designates a flow meter, and reference numeral 17 designates a cock.

Figure 4:
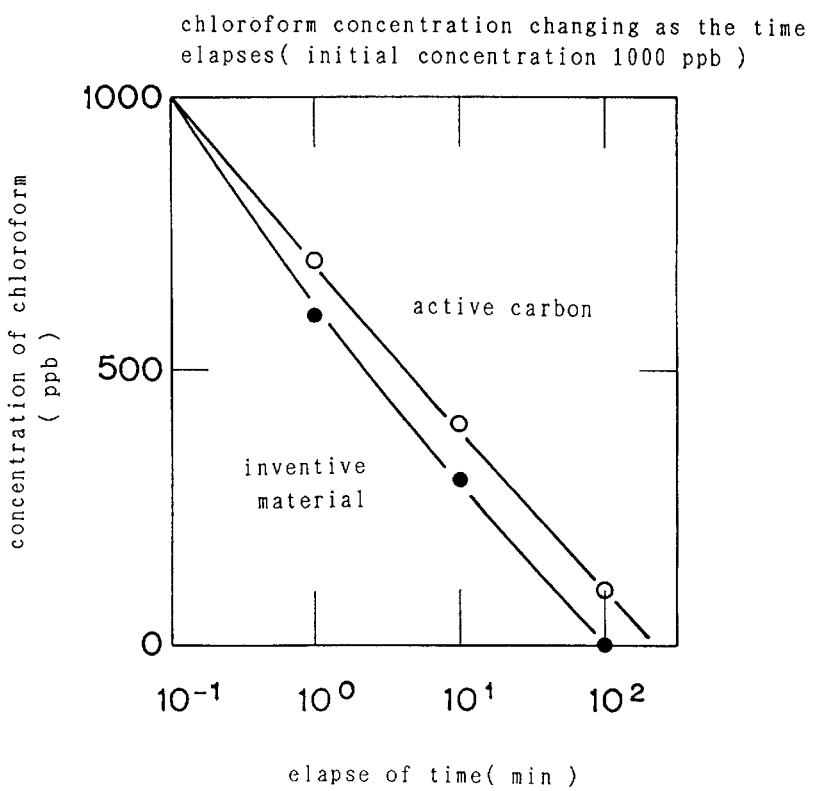
FIG. 4 is a graphic diagram showing a decontaminating ability of the inventive apparatus.
Figure 5:
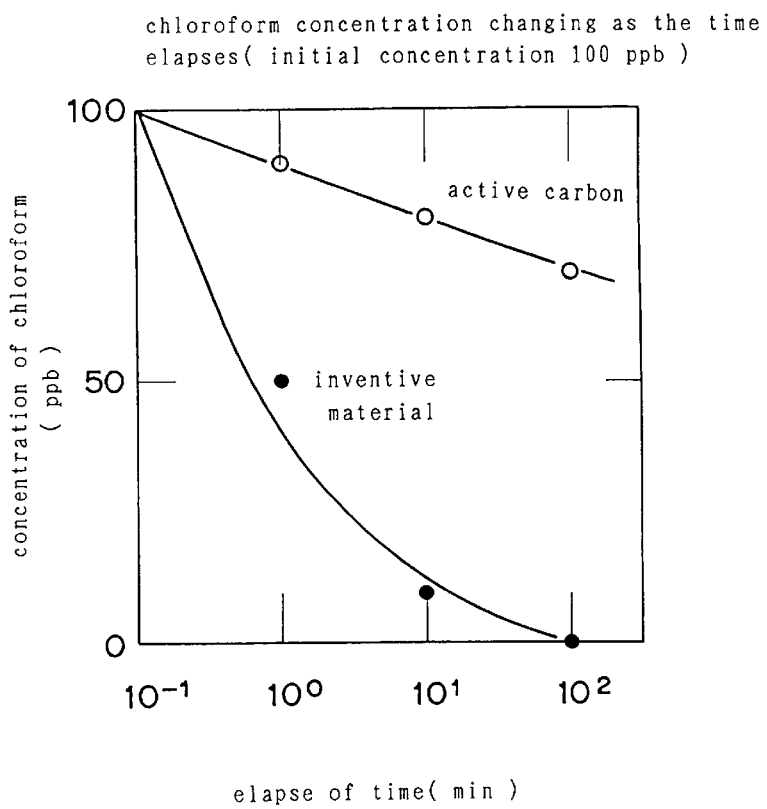
FIG. 5 is a graphic diagram also showing a decontaminating ability of the inventive apparatus.

The organic halide adsorption cylinder 1 was filled with 270 g of hydroxybutyric acid-hydroxyvalerianic acid copolymer (content of hydroxyvalerianic acid: approximately 14 mol %) in the form of fine particles (particle diameter: approximately $10\mu$), on one hand, and the similar cylinder was filled with 450 g of commercially available active carbon particles (particle diameter: approximately $10\mu$), for comparative observation, on the other hand. Then, water (containing chloroform dissolved therein) in the reservoir 12 was circulated at a rate of 4 litre/min along a course A→B→C→D→E→F→G. Concentration of chloroform in the reservoir 12 changing as the time elapses was determined, assumed that the initial concentration of chloroform in the reservoir 12 is 1000 p p b and 100 p p b, respectively. Results are shown by FIGS. 4 and 5, respectively.

When the initial concentration of chloroform was relatively high (1000 p p b), no significant difference in the rate of chloroform removal was observed between the fine particles of hydroxybutyric acid-hydroxyvalerianic acid copolymer and the commercially available active carbon particles. However, when the initial concentration of chloroform was relatively low (100 p p b), the fine particles of hydroxybutyric acid-hydroxyvalerianic acid copolymer achieved removal of chloroform at a rate higher than the rate achieved by the commercially available active carbon particles:

EXAMPLE 2

In the apparatus illustrated by FIG. 2, the organic halide adsorption cylinder 1 was filled with 270 g of mixture having a composition shown by Table 1.

TABLE 1

| composition of material filled in organic halide adsorption cylinder | | |
|---|---|---|
| ingredients | particle diameter ($\mu$) | percentage (% by weight) |
| polyhydroxybutyric acid | 100 more or less | 85 |
| polylactic acid | 100 more or less | 10 |
| air-dried linolenic acid | 30 more or less | 3 |
| ion exchange resin | 50 more or less | 2 |

Figure 6:
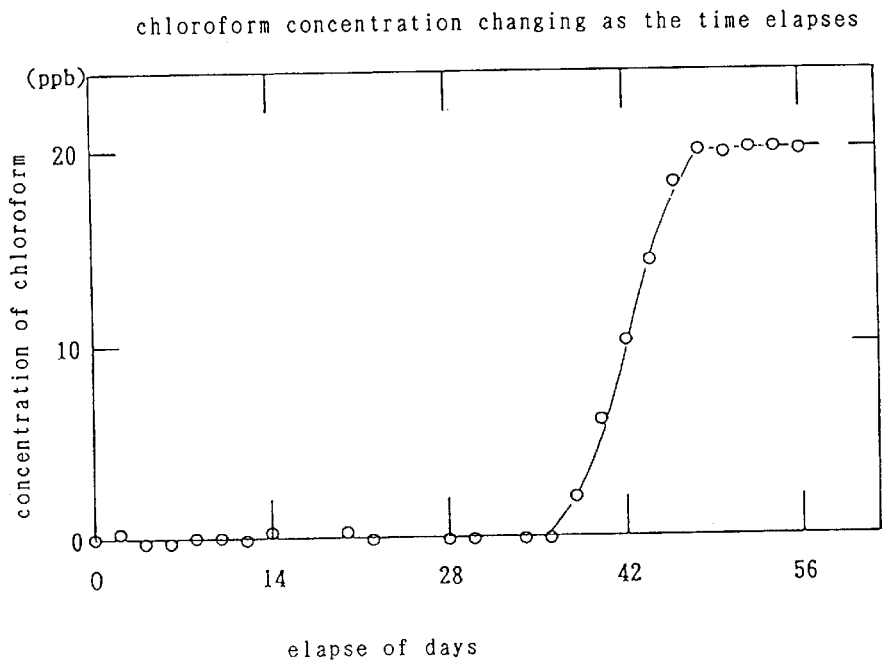
FIG. 6 is a graphic diagram also showing a decontaminating ability of the inventive apparatus.

The active carbon adsorption cylinders 6 and 7 were filled with 450 g of commercially available active carbon particles (particle diameter: approximately $10\mu$), respectively. Water containing chloroform at a concentration of 20 p p b was supplied to the serial arrangement of three cylinders at the inlet 9 so that said water containing chloroform at a concentration of 20 p p b may be discharged from the outlet 10 at a flow rate of 4 litre/min and the concentration of chloroform in water changing as the time elapses was determined at the outlet 10. Results are shown by FIG. 6.

With this specific embodiment of the inventive apparatus, water containing chloroform of 20 p p b was satisfactorily processed continuously for 30 days. Adsorption ability for chloroform was then sharply lowered and, 45 days after, practically no adsorption ability for chloroform was observed. Based on this experimental result, it is estimated that 0.013 g of chloroform can be adsorbed per 1 g of the inventive material. Totally, it is estimated that approximately 3.5 g of chloroform can be adsorbed by the apparatus. It is also estimated that approximately 170 ton(1000 kg) water containing chloroform having average concentration of 20 p p b can be purified by the apparatus without refilling of the inventive material.

Effect of the Invention:

As will be apparent from the foregoing description, the organic halides remaining in water at a concentration in the order of p p b even after the active carbon adsorption process can be efficiently removed by using the inventive apparatus to an unanalyzable concentration. While the concentration of organic halides in water can be easily decreased to several hundred p p b by using the active carbon adsorption process that is well known in the art, in such a range of concentrations, the adsorption equilibrium of organic halides on the active carbon cannot be disregarded and this equilibrium prevents further quantity of organic halides from being adsorbed on the active carbon so as to attain a concentration that is less than an order of several hundred p p b. The concentration of several hundred p p b is substantially higher than the standard value prescribed for foul water. To meet this standard for foul water, there is no measure other than prohibiting use of organic halides. However, organic halides can be removed so as to attain unanalyzable concentration by using the inventive apparatus together with the conventional active carbon.

The inventive apparatus is applicable for various purposes such as purification of waste or foul water discharged from plants, dry cleaners, laboratories, water purification for waterworks and purification of drinking water in households so that substantially organic halidefree water may be obtained.

What is claimed is:

1. A method of purifying water from organic halides contained therein which comprises contacting a sample of water suspected of containing impurities with a bed of particles, fibers, nonwoven fabric, porous body or sintered body comprised of a hydroxycarboxylic acid or a polymer thereof having the formula:

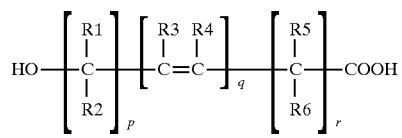

wherein R1–R6 are identical or different and represent a hydrogen atom, hydroxyl-, carboxyl-, amino-, cyano- or alkyl-group having 1–5 carbons, p represents an integer of 1–10, and q and r repersent an integer of 0–10.

2. A method according to claim 1, which further comprises contacting said sample of water with at least one member selected from the group consisting of (a) hydroxy-fatty acid, polymer or bridge compound thereof, (b) an ion exchange resin and (c) an active carbon.

3. The method according to claim 2, wherein said hydroxycarboxylic acid or polymer thereof is a member selected from the group consisting of hydroxystearic acid, hydroxyoleic acid-hydroxyvalerianic acid copolymer, polylacetic acid, polyglyceric acid and polyglycolic acid.

4. The method according to claim 1, wherein said hydroxycarboxylic acid or polymer thereof is a member selected from the group consisting of hydroxystearic acid, hydroxyoleic acid-hydroxyvalerianic acid copolymer, polylacetic acid, polyglyceric acid and polyglycolic acid.

5. An apparatus for purifying water from organic halides contained therein comprising:

a fluid inlet;
a first container which comprises a bed of particles, fibers, nonwoven fabric, porous body or sintered body comprised of a hydroxycarboxylic acid or a polymer thereof having the formula:

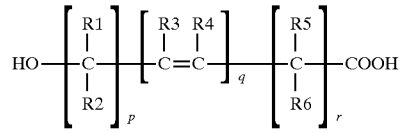

where R1–R6 are identical or different and represent a hydrogen atom, hydroxyl-, carboxyl-, amino-, cyano- or alkyl-group having 1–5 carbons, p represents an integer of 1–10, and q and r represent an integer of 0–10; and
a fluid outlet.

6. The apparatus according to claim 5, wherein said first container additionally comprises at least one member selected from the group consisting of (a) hydroxy-fatty acid, polymer or bridge compound thereof, (b) an ion exchange resin and (c) an active carbon.

7. The apparatus according to claim 5, further comprising at least one second container which comprises at least one member selected from the group consisting of (a) hydroxy-fatty acid, polymer or bridge compound thereof, (b) an ion exchange resin and (c) an active carbon.

8. The apparatus according to claim 5, wherein said hydroxycarboxylic acid or polymer thereof is a member selected from the group consisting of hydroxystearic acid, hydroxyoleic acid-hydroxyvalerianic acid copolymer, polylacetic acid, polyglyceric acid and polyglycolic acid.

9. The apparatus according to claim 7, further comprising at least one third container comprising an ion exchange resin and/or a hydroxy-fatty acid or polymer or bridge compound thereof in fluid communication downstream from said first container.

10. An apparatus for purifying water from organic halides contained therein comprising:

a fluid inlet;
a first container which comprises a bed of particles, fibers, nonwoven fabric, porous body or sintered body containing hydroxycarboxylic acid or a polymer thereof having a chemical structure of the formula:

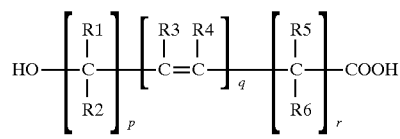

where R1–R6 are identical or different and represent hydrogen atom, hydroxyl-, carboxyl-, amino-, cyano- or alkyl-group having 1–5 carbons, p represents a natural number 1–10, and q and r represent an integer 0–10;
a fluid outlet; and
at least one second container which comprises an active carbon, wherein said at least one second container is in fluid communication with said first container.

11. The apparatus according to claim 10, further comprising at least one third container comprising an ion exchange resin and/or a hydroxy-fatty acid or polymer or bridge compound thereof in fluid communication downstream from said first container.

12. The apparatus according to claim 10, wherein said hydroxycarboxylic acid or polymer thereof is a member selected from the group consisting of hydroxystearic acid, hydroxyoleic acid-hydroxyvalerianic acid copolymer, polylacetic acid, polyglyceric acid and polyglycolic acid.

* * * * *